(12) United States Patent
He et al.

(10) Patent No.: US 6,919,047 B1
(45) Date of Patent: Jul. 19, 2005

(54) REDUCTION OF NITROGEN OXIDES IN DIESEL EXHAUST GASES AND FUEL INJECTION SYSTEM

(75) Inventors: Lin He, Horseheads, NY (US); Steven B. Ogunwumi, Corning, NY (US)

(73) Assignee: Corning Incorporated, Corning, NY (US)

( * ) Notice: Subject to any disclaimer, the term of this patent is extended or adjusted under 35 U.S.C. 154(b) by 777 days.

(21) Appl. No.: 09/685,654

(22) Filed: Oct. 10, 2000

(51) Int. Cl.⁷ ................................................. B01J 23/34
(52) U.S. Cl. ..................... 422/122; 422/168; 422/177; 422/180; 422/182; 502/302; 502/303; 502/324; 502/325
(58) Field of Search ................................ 502/302, 303, 502/324, 325; 422/122, 168, 177, 180, 182

(56) References Cited

U.S. PATENT DOCUMENTS

| | | | |
|---|---|---|---|
| 4,049,583 A | * 9/1977 | Lauder | 502/303 |
| 4,111,162 A | * 9/1978 | Norimatsu et al. | 123/683 |
| 4,119,070 A | * 10/1978 | Asano | 123/690 |
| 4,134,852 A | * 1/1979 | Volin | 502/302 |
| 4,178,884 A | * 12/1979 | Norimatsu et al. | 123/676 |
| 4,186,691 A | * 2/1980 | Takase et al. | 123/325 |
| 5,189,876 A | 3/1993 | Hirota et al. | |
| 5,208,205 A | 5/1993 | Subramanian et al. | |
| 5,380,692 A | * 1/1995 | Nakatsuji et al. | 502/303 |
| 5,711,147 A | 1/1998 | Vogtlin et al. | |
| 5,833,932 A | 11/1998 | Schmelz | |
| 5,863,508 A | 1/1999 | Lachman et al. | |
| 5,968,464 A | 10/1999 | Peter-Hoblyn et al. | |
| 5,977,017 A | 11/1999 | Golden | |

OTHER PUBLICATIONS

Takiguchi et al. "Catalytic Engine" NOx Reduction of Diesel Engines with New Concept Onboard Ammonia Synthesis System, 8 pgs. no date.

Becue et al., Effect of Cationic Promoters on the Kinetics of Ammonia Synthesis Catalyzed by Ruthenium Supported on Zeolite X, Journal of Catalysis 179, p. 129–137, 1998.

Aika et al., On–Site Ammonia Synthesis in De–NOx Process, Catalysis Today, 10, 1991, p. 73–80. Jacoby, Getting Auto Exhausts to Pristine, Jan. 25, 1999, C&EN, p. 36–44.

Balmer et al., Diesel NOx Reduction of Surfaces in Plasma, Paper 9825H, 7 pgs, no date.

Kuroda et al., Study of NH3 Formation and Its Control in the NOx Control System, p. 41–53, no date.

Fishel et al., Ammonia Synthesis Catalyzed by Ruthenium Supported on Basic Zeolites, Journal of Catalysis 163, p. 148–157, 1996.

Zhong et al., Effect of Ruthenium Precursor on Hydrogen–Treated Active Carbon Supported Ruthenium Catalysts for Ammonia Synthesis, Inorganics Chimica Acta 280, 1998, p. 183–188.

Iwamoto et al., NOx Emission Control in Oxygen–Rich Exhaust Through Selective Catalytic Reduction by Hydrocarbon, Imech E, 1993, p. 23–33.

Gilot et al., A Review of NOx Reduction on Zeolitic Catalysts Under Diesel Exhaust Conditions, Fuel 1997, vol. 76, No. 6, p. 507–515.

Fritz et al., The Current State of Research on Automotive Lean NOx Catalysis, Applied Catalysis B: Env.I 13; 1997; 1–25. *Lean NOx Catalyst, DieselNet Technology Guide*, p. 1–8.

* cited by examiner

*Primary Examiner*—Christina Johnson
(74) *Attorney, Agent, or Firm*—Anca C. Gheorghiu; Kees van der Sterre

(57) ABSTRACT

A method for reducing $NO_x$ in lean exhaust gases to $N_2$ includes injecting a fuel into the exhaust gases and passing the exhaust gases and fuel mixture through a catalyst to reduce the $NO_x$ to $N_2$. The catalyst may be (a) a perovskite compound, (b) at least one metal oxide impregnated with at least one precious metal, (c) a zeolite impregnated with at least one precious metal, or (d) a combination of a zeolite and at least one metal oxide impregnated with at least one precious metal.

3 Claims, 1 Drawing Sheet

REDUCTION OF NITROGEN OXIDES IN DIESEL EXHAUST GASES AND FUEL INJECTION SYSTEM

BACKGROUND OF THE INVENTION

Nitrogen oxides ($NO_x$) in the earth's atmosphere are primarily emitted by automobiles and industrial plants. Studies have shown that nitrogen oxides can be hazardous to human health and the environment when present in the atmosphere in sufficiently high concentrations. For instance, nitrogen oxides above 0.05 ppm can have hazardous effects on people in good health for an exposure of over 24 hours. See, Fritz, A. and Pitchon, V., "The current state of research on automotive lean $NO_x$ catalysts," Applied Catalysis B: Environmental, Vol. 13 (1997), pp. 2. In particular, nitrogen oxides have been found to provoke lung infection and respiratory allergies. Nitrogen oxides have also been found to play an influential role in the formation of acid rain, smog, and general atmospheric visibility degradation. Because of the potential detrimental effects of nitrogen oxides on human health and the environment, the government has imposed several stringent regulations on $NO_x$ emissions. These lightened regulations continue to drive $NO_x$ abatement technology.

Several technologies have been developed in order to decrease $NO_x$ emissions, including passive methods using catalysts and active approaches such as electrochemical catalysis, photocatalytical approaches, plasma, laser, and so forth. Rich-burning engines, such as those used in today's gasoline-powered automobiles, use a three-way catalyst to reduce $NO_x$ emissions. The three-way catalyst typically consists of a combination of noble metals deposited on a stabilized alumina carrier. The three-way catalyst is efficient because it works together with a feedback system that directs the engine to blend air and fuel in stoichiometric proportions. By controlling the air-to-fuel ratio, the engine makes hydrocarbons and carbon monoxide available in just the right amounts to reduce $NO_x$ and unburned hydrocarbons to products like carbon dioxide, water, hydrogen gas, and nitrogen gas that are generally harmless to health and the environment. The $NO_x$ performance of the three-way catalyst, however, rapidly deteriorates in the presence of oxygen.

Removal of $NO_x$ in lean-burn engines, i.e., engines such as diesel engines that burn fuel in excess oxygen, continues to pose a great scientific challenge. There is sufficient motivation, however, to continue to pursue a practical solution for reducing $NO_x$ emissions in lean-burn engines because lean-burn engines provide better fuel economy than rich-burning engines. As previously mentioned, the $NO_x$ reducing performance of the three-way catalyst, which is the standard $NO_x$ abatement technology for gasoline engines, deteriorates rapidly in the presence of oxygen. Thus, this technology is ineffective in controlling $NO_x$ emissions in lean exhaust gases. Some of the approaches that have been considered in controlling $NO_x$ emissions in lean exhaust gases include catalytic decomposition of nitrogen monoxide (NO), selective catalytic reduction (SCR) with nitrogen containing compounds, and selective catalytic reduction with hydrocarbons (HC-SCR).

The decomposition of nitrogen monoxide to elements is described by the following equation:

$$NO \rightarrow \tfrac{1}{2}N_2 + \tfrac{1}{2}O_2 \qquad (1)$$

The decomposition of nitrogen monoxide is thermodynamically favored under pressures and temperatures found in diesel exhaust. However, the decomposition reaction is inhibited by a high activation energy. Therefore, a catalyst is necessary to lower this activation energy in order to facilitate this decomposition. Various catalysts have been used to decompose NO, including precious metals, metallic oxides, and zeolites-based catalysts. One of the best catalysts recently suggested for NO decomposition is copper ion-exchanged zeolite ZSM5 (Cu/ZSM5). However, the catalytic activity of Cu/ZSM5 is greatly diminished in the presence of oxygen gas and sulfur dioxide, and the decomposition of NO is effective only at low space velocities.

In SCR with nitrogen containing compounds, a nitrogen compound, e.g., ammonia or urea, is used as a reducing agent for nitrogen oxides to produce innocuous products. In reactions (2) and (3) below, ammonia is used as the reducing agent for nitrogen oxides to produce nitrogen and water:

$$4NO + 4NH_3 \rightarrow 4N_2 + 6H_2O \qquad (2)$$

$$6NO_2 + 8NH_3 \rightarrow 7N_2 + 12H_2O \qquad (3)$$

The reactions (2) and (3) are favored in the presence of oxygen. In the presence of oxygen, a catalyst such as vanadium pentoxide ($V_2O_5$) supported on oxides such as $TiO_2$, $Al_2O_3$, and $SiO_2$ is used to facilitate the reaction. In $NH_3$-SCR, an external source of ammonia is needed to reduce $NO_x$ to $N_2$. $NH_3$-SCR is widely used as a pollution reduction technique in stationary plants such as electric power plants. The toxicity and handling problems associated with ammonia, however, has limited the use of the technology in motor vehicles.

U.S. Pat. No. 5,863,508 issued to Lachman et al. describes a multi-stage catalytic reactor system which allows ammonia to be synthesized onboard a vehicle and then used to reduce $NO_x$ to $N_2$ as previously described in reactions (2) and (3) above. The reactor system includes two units, each of which includes multiple open-ended cells. A portion of the cells in the first unit include a first stage catalyst, which is a noble metal on a support. The noble metal cannot be rhodium. Exhaust gases from combustion are passed through the first unit so that a portion of the $NO_x$ in the exhaust gases is reduced to ammonia by the first stage catalyst. The modified exhaust gas mixture is then passed to the second unit, wherein the ammonia in the modified gas mixture is reacted with the remaining $NO_x$ to yield a converted gas mixture. An external source of ammonia is not needed because the ammonia is generated in the first unit. The passage of the exhaust gases through the first and second units results in conversion of $NO_x$, CO, and hydrocarbons to innocuous products. This technology is effective for lean burn engines.

HC-SCR was discovered during the survey of the effect of co-existing gases on the catalytic activity of Cu/ZSM5. In HC-SCR, hydrocarbons, e.g., ethane, propane, and propene, selectively react with $NO_x$ to produce nitrogen, carbon dioxide, and water:

$$\{HC\} + NO_x \rightarrow N_2 + CO_2 + H_2O \qquad (4)$$

There are three principal types of catalysts active for the HC-SCR, including zeolites, oxide-type catalysts, and supported noble metals. See, for example, Iwamoto, M. and Mizuno, N., "$NO_x$ emission control in oxygen-rich exhaust through selective catalytic reduction by hydrocarbon," Journal of Automobile Engineering (1993), pp. 23–33, and Fritz, A. and Pitchon, V., "The current state of research on automotive lean $NO_x$ catalysts," supra, pp. 10–25, for additional discussions on catalysts for HC-SCR. In this technology, additional HC must be supplied and a system is required to deliver the HC. Controlling the amount of HC needed is a great challenge. Furthermore, excess oxygen may affect $NO_x$ conversion.

SUMMARY OF THE INVENTION

In one aspect, the invention relates to a method for reducing $NO_x$ in lean exhaust gases to $N_2$. The method comprises injecting a fuel into the exhaust gases and passing the exhaust gases and fuel mixture through a catalyst to reduce the $NO_x$ to $N_2$.

In another aspect, the invention relates to a fuel injection system which comprises a catalytic reactor having an inlet end that receives exhaust gases and an outlet end that outputs converted exhaust gases. The fuel injection system further includes a catalyzed substrate mounted inside the catalytic reactor for reducing $NO_x$ in the received exhaust gases to $N_2$ in the presence of a fuel. The fuel injection system further includes a fuel injector for injecting the fuel upstream of the catalyzed substrate.

In another aspect, the invention relates to a catalyst composition for reducing $NO_x$ in lean exhaust gases to $N_2$ using a fuel as the reductant. In some embodiments, the catalyst composition comprises a perovskite compound represented by the formula $AB_{1-x}PM_xO_3$, where A is a rare-earth metal, B is a transition metal, PM is a precious metal, and O is oxygen. In some embodiments, the catalyst composition comprises at least one metal oxide impregnated with at least one precious metal. In some embodiments, the catalyst composition comprises a zeolite impregnated with at least one precious metal. In some embodiments, the catalyst composition comprises a combination of a zeolite and at least one metal oxide impregnated with at least one precious metal.

In another aspect, the invention relates to a catalytic unit for reducing $NO_x$ in lean exhaust gases to $N_2$ using a fuel as the reductant. In some embodiments, the catalytic unit comprises a body extruded from a zeolite which is impregnated with at least one precious metal. In some embodiments, the catalytic unit comprises a ceramic substrate coated with a catalytic material. In some embodiments, the catalytic material includes at least one metal oxide impregnated with at least one precious metal. In some embodiments, the catalytic material includes a combination of a zeolite and at least one metal oxide impregnated with at least one precious metal. In some embodiments, the catalytic includes a perovskite compound represented by the formula $AB_{1-x}PM_xO_3$, where A is a rare-earth metal, B is a transition metal, PM is a precious metal, and O is oxygen.

Other aspects and advantages of the invention will be apparent from the following description and the appended claims.

DETAILED DESCRIPTION OF THE INVENTION

Embodiments of the invention provide a $NO_x$ de-pollution ($deNO_x$) catalyst and a reductant injection system which uses the $deNO_x$ catalyst. In the reductant injection system, diesel fuel is post-injected into diesel exhaust gas and used as a reductant for the reduction of $NO_x$ to $N_2$ through the $deNO_x$ catalyst. Diesel fuel is injected continuously or periodically based on the requirement of the total $NO_x$ conversion and fuel penalty. In some embodiments of the invention, the $deNO_x$ catalyst includes one or more perovskite compounds represented by the formula $AB_{1-x}PM_xO_3$, where A is a group III or group IV rare-earth metal, B is a group III or group IV transition metal, PM is a precious metal, O is oxygen. Preferably, x ranges from 0.01 to 0.3. In some embodiments of the invention, the $deNO_x$ catalyst includes a support material impregnated with a precious metal or a combination of precious metals. The support material is made of a metal oxide or a combination of two or more metal oxides. In some embodiments of the invention, the $deNO_x$ catalyst includes a zeolite impregnated with a precious metal, or a combination of precious metals. Zeolites are silicates consisting of interlocking tetrahedrons of $SiO_x$ and $AlO_y$. In some embodiments, of the invention, the $deNO_x$ catalyst includes a combination of a zeolite and metal oxide impregnated with a precious metal, or a combination of precious metals.

Figure 1:
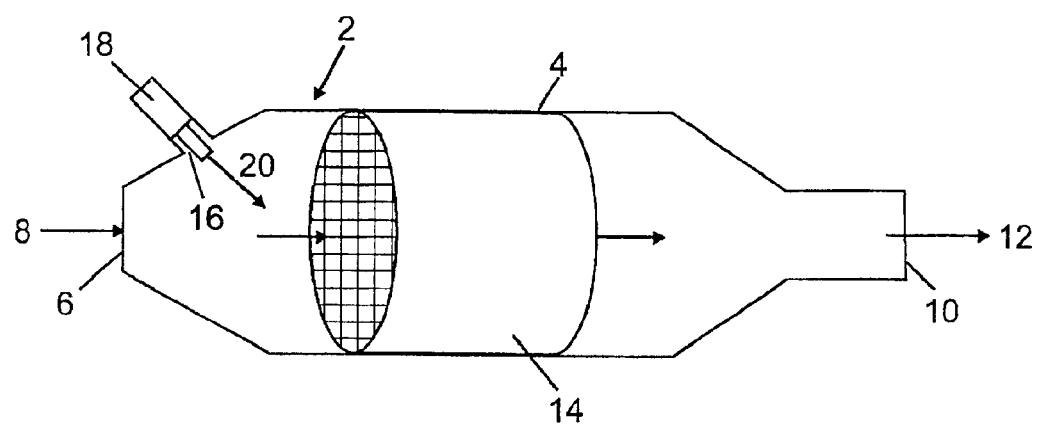
FIG. 1 schematically shows a reductant injection system in accordance with an embodiment of the invention.

Various embodiments of the invention will now be described with reference to the accompanying figures. FIG. 1 schematically shows a reductant injection system 2 which includes a catalytic reactor 4 having an inlet end 6 for receiving exhaust gases 8 and an outlet end 10 for outputting converted exhaust gases 12. A $deNO_x$ catalyst 14 is mounted inside the catalytic reactor 4. A port 16 is provided in the wall of the catalytic reactor 4, upstream of the $deNO_x$ catalyst 14. The reductant injection system 2 further comprises a fuel injector 18 which is coupled to the port 16. Preferably, the fuel injector 18 is as close as possible to the $deNO_x$ catalyst 14. In operation, exhaust gases 8 are introduced into the catalytic reactor 4 through the inlet end 6. Diesel fuel 20 is injected into the catalytic reactor 4 through the port 16. The diesel fuel 20 may be injected continuously or periodically. The injected diesel fuel 20 mixes with the exhaust gases 8. The resulting mixture then passes through the $deNO_x$ catalyst 14. The $deNO_x$ catalyst 14 converts $NO_x$ into innocuous products. The converted gas mixture 12 exits the catalytic reactor 4 through the outlet end 10.

Catalytic activities of various embodiments of the $deNO_x$ catalyst 14 are evaluated by placing individual $deNO_x$ catalysts inside the catalytic reactor 4 and passing exhaust gases mixed with diesel fuel through the catalysts. For the reduction of $NO_x$ to $N_2$ using diesel fuel, simulated diesel exhaust gases having the composition indicated in Table I are introduced into the inlet end 6 of the catalytic reactor 4.

TABLE 1

Composition of Simulated Diesel Exhaust Gases

| Gas | Amount (by volume) |
| --- | --- |
| $O_2$ | 3–6 percent |
| $CO_2$ | 14 percent |
| $NO_x$ | 500–1065 ppm |
| CO | 350 ppm |
| $H_2O$ | 10–12 percent |

The conversion of $NO_x$ to $N_2$ is studied by varying the amount of diesel fuel injected through the port 16 into the catalytic reactor 2. In the study, the diesel fuel is injected by a gasoline fuel injector, which, for safety reasons, had a lower pressure in comparison with a typical diesel fuel injector. This lower injection pressure may result in incomplete fuel consumption. The typical fuel injection rates in the study are 2.2 mg/s, 1.75 mg/s, and 1.4 mg/s of diesel fuel, which correspond to 0.004, 0.0035, and 0.003 injection cycles, respectively. In a period of t seconds, u injection cycle means that the fuel is injected for t*u seconds. For a 1000-second period, for example, 0.004 injection cycle means that the fuel is injected for 4 seconds.

For comparison purposes, catalyst activity using synthetic hydrocarbons as the exhaust gases is also investigated. For the reduction of $NO_x$ to $N_2$ using synthetic hydrocarbons, synthetic gas mixture having the composition indicated in Table 2 is introduced into the inlet end 6 of the catalytic reactor 4.

TABLE 2

Composition of Synthetic Gas Mixture

| Gas | Amount (by volume) |
|---|---|
| $O_2$ | 0.77 percent |
| $CO_2$ | 14 percent |
| $NO_x$ | 1000 ppm |
| CO | 1000 ppm |
| $C_3H_6$ | 333 ppm |
| $C_3H_8$ | 167 ppm |
| $H_2$ | 0.33 percent |
| $H_2O$ | 10–12 percent |

The synthetic gas mixture in Table 2 gives approximately 1.2 redox ratio. The synthetic gas flow is nitrogen-balanced, resulting in a total flow of 7508 Ml/min. This flow rate corresponds to a space velocity of 35,000 per hour. The space velocity can be varied by adjusting the feed flow rates of the gas mixture. Typically, the catalytic activity is measured with the catalytic reactor 2 operating within a temperature range of 60° C. to 600° C. A temperature ramp rate is set for 8.5° C./min until the catalytic reactor 2 reaches 600° C., and then the operating temperature of the catalytic reactor 2 is maintained at this temperature for approximately 15 minutes.

Prior to each run, the gases introduced into the inlet end 6 of the catalytic reactor 2 are quantified. A mass balance of the initial $NO_x$ concentration in the inlet gas mixture with respect to the amount of $NH_3$, $N_2O$, and $NO_2$ formed downstream of the catalyzed substrate is used to determine the amount of $N_2$ produced. The percent total NO conversion and the percent amount of $NH_3$ and $N_2$ formed are determined by the following equations:

$$\text{Total NO conversion}(\%) = \left[\left(\frac{C_{NO}}{C_{NO,in}}\right) - 1\right] \times 100 \quad (5)$$

$$NH_3(\%) = \frac{C_{NH_3}}{C_{NO,in}} \times 100 \quad (6)$$

$$N_2(\%) = \quad (7)$$
$$\text{NO conversion}(\%) - [NH_3(\%) + NO_2(\%) + 2xN_2O(\%)]$$

Figure 2:
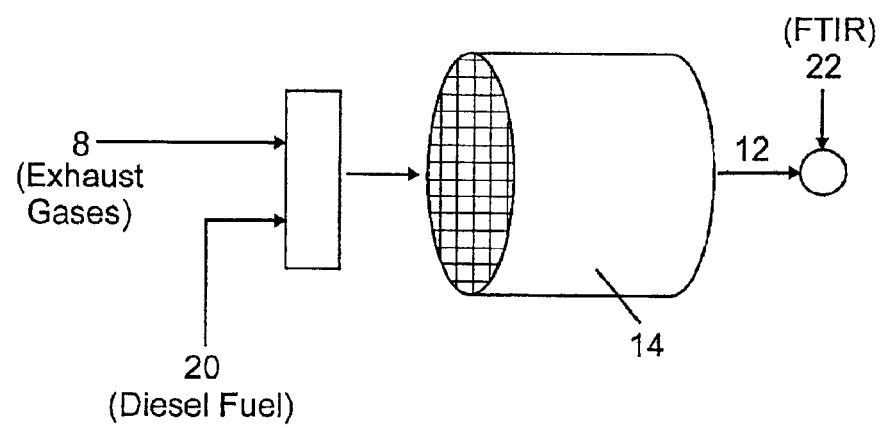
FIG. 2 shows a setup for evaluating the $deNO_x$ catalysts of the present invention.

As shown in FIG. 2, the converted gas mixture 12 downstream of the deNO$_x$ catalyst 14 is analyzed by a Fourier Transform Infrared Spectrometer (FTIR) 22, such as one sold under the trade name Magna Infrared 560 Spectrometer by Nicolet Instrument Corporation, Madison, Wis. FTIR 22 allows all the species of interest such as NO, $NH_3$, $N_2O$, $NO_2$, CO, $CO_2$, $H_2O$, $C_3H_6$, $C_3H_8$, and other hydrocarbons to be simultaneously monitored.

The following examples of deNO$_x$ catalysts are subjected to the testing procedure to determine their effectiveness in converting $NO_x$ to innocuous products using the reductant injection system 2 described above. It should be clear that the following examples are intended for illustration purposes and are not intended to limit the scope of the invention as otherwise described herein.

EXAMPLE 1

In one embodiment of the invention, the deNO$_x$ catalyst 14 (shown in FIG. 1) includes one or more perovskite compounds represented by the formula $AB_{1-x}PM_xO_3$, where A is a group III or group IV rare-earth metal, B is a group III or group IV transition metal, PM is a precious metal, O is oxygen. Preferably, x ranges from 0.01 to 0.3. To obtain a relatively high surface area, the perovskite-based deNO$_x$ catalyst can be synthesized by a method called the Pechini process. For a C1 deNO$_x$ catalyst based on a perovskite compound $LaMn_{0.9}Ru_{0.1}O_3$, the Pechini process involves dissolving lanthanum nitrate in aqueous manganese nitrate and adding citric acid and ethylene glycol to the mixture to obtain a chelated complex. The ratio of citric acid to lanthanum (La) and manganese (Mn) is one to one, e.g., two moles of citric acid to one mole of $LaMn_{0.9}Ru_{0.1}O_3$. The amount of ethylene glycol to add to the mixture is calculated by the following equation:

$$\text{weight of ethylene glycol} = 1.5 \times \text{weight of citric acid} \times \text{density of ethylene glycol} \quad (8)$$

The chelated complex is heated to 90° C. to form a gel. The temperature of the gel is then increased to 120° C. to remove all the water and $NO_x$ fumes, and the gel is puffed out, i.e., ignited, to get the powder. The puffed-out powder is fired at 450° C. for 4 hours to dry and remove carbon from the powder. After that, the powder is sintered at 700° C. or any desirable temperature to get the final product. The powder is ball milled for 2–5 days. About 90 percent of the milled powder is then combined with about 10 percent of a binder, e.g., colloidal alumina sold under the trade name Al-20 by PQ corporation, Philadelphia, Pa., to form a washcoat slurry. A ceramic substrate, e.g., cordierite honeycombs made by Corning, Inc., Corning, N.Y., under the trade name Celcor®, is dipped in the washcoat slurry. In general, any ceramic substrate that can withstand temperatures of about 150° C. to 600° C. can be used in the invention. The ceramic substrate is fired in air or reducing atmosphere, e.g., forming gas or nitrogen gas, or exhaust gas at 600° C. for 3 hours with a ramp rate of 3° C./min.

The composition of the C1 deNO$_x$ catalyst is as follows: 90 percent $LaMn_{0.9}Ru_{0.1}O_3$ and 10 percent $Al_2O_3$. Activity of this catalyst in simulated diesel exhaust gases (see Table 1) was evaluated using the testing procedure outlined above (see FIG. 2). As shown in Table 3, the C1 deNO$_x$ catalyst demonstrated a high total NO conversion of 81.5 to 96.3 percent with diesel fuel injection rate of 1.4 mg/s and outlet temperature of 300° C. to 500° C., i.e., temperature at the outlet end 10 of the catalytic reactor 2 (shown in FIG. 1). About 70 to 84 percent of $N_2$ is generated in the outlet temperature window with 10 to 12 percent $NH_3$ as a by-product. The concentrations of $N_2O$ and $NO_2$ are negligible. The high NO conversion indicates that C1 can crack the diesel fuel efficiently to lighter hydrocarbon or reducing agents which can enhance the reduction of $NO_x$ to $N_2$. Decreasing the amount of the diesel fuel injected upstream of the catalyst can reduce the amount of $NH_3$ produced.

TABLE 3

Summary of Catalyst Activity for C1 DeNO$_x$ Catalyst Using Simulated Diesel Exhaust Gases

| O$_2$ (%) | Diesel Injection Rate (mg/s) | Outlet Temp. (° C.) | Total NO Conversion (%) | NH$_3$ (%) | N$_2$ (%) | Initial NO (ppm) |
|---|---|---|---|---|---|---|
| 6 | 1.4 | 300 | 88.5 | 11.5 | 77 | 480 |
| 6 | 1.4 | 350 | 92.3 | 10.4 | 81.9 | 480 |
| 6 | 1.4 | 380 | 95.9 | 12.5 | 83.4 | 480 |
| 6 | 1.4 | 404 | 96.3 | 11.7 | 84.6 | 480 |
| 6 | 1.4 | 430 | 95.4 | 11.0 | 84.4 | 480 |
| 6 | 1.4 | 483 | 79.4 | 10.4 | 69 | 480 |
| 6 | 1.4 | 520 | 81.5 | 11.5 | 70 | 480 |

For comparison purposes, the catalytic performance of the C1 deNO$_x$ catalyst was also tested in a synthetic gas mixture (see Table 2). In this case, the synthetic gases were used as reductants. As shown in Table 4, the highest NO to N$_2$ conversion observed is 33.5 percent at outlet temperature of 576° C. At lower temperatures such as 300° C., NO conversion was as low as 4 percent. As can be observed from the data in Tables 3 and 4, the NO to N$_2$ conversion is much lower when synthetic gases were used instead of diesel fuel.

TABLE 4

Summary of Catalyst Activity for C1 DeNO$_x$ Catalyst Using Synthetic Gas Mixture

| O$_2$ (%) | Diesel Injection Rate (mg/s) | Outlet Temp. (° C.) | Total NO Conversion (%) | NH$_3$ (%) | N$_2$ (%) | Initial NO (ppm) |
|---|---|---|---|---|---|---|
| 6 | 0 | 300 | 4 | 0 | 4 | 1080 |
| 6 | 0 | 400 | 12 | 0 | 12 | 1080 |
| 6 | 0 | 500 | 25.5 | 0 | 25.5 | 1080 |
| 6 | 0 | 576 | 33.5 | 0 | 33.5 | 1080 |

EXAMPLE 2

In another embodiment of the invention, the deNO$_x$ catalyst 14 includes a support material impregnated with one or more precious metals. Examples of precious metals suitable for use in the invention are rhodium (Rh), platinum (Pt), palladium (Pd), iridium (Ir), and ruthenium (Ru). The support material is made of a metal oxide or a combination of two or more metal oxides. A C2 deNO$_x$ catalyst is attained by impregnation of non-stoichiometric titanium oxide (TiO$_{2-x}$) with Rh and Pt. In this example, x is 0.25. The non-stoichiometric titanium oxide is obtained by mixing one mole of Ti$_2$O$_3$ and two moles of TiO$_2$ and then firing the mixture at 1100° C. for 5 hours in forming gas (6 percent H$_2$/94 percent N$_2$). The fired mixture is impregnated with Pt by dipping repeatedly in (NH$_3$)$_4$Pt(NO$_3$)$_2$ solution. The resulting mixture is dried in an oven at 110° C. to 120° C. for 24 hours and then fired for three hours in air at 560° C. The Pt—TiO$_{2-x}$ mixture is impregnated with Rh by dipping repeatedly in Rh solution. The resulting mixture is dried in an oven at 110° C. to 120° C. for 24 hours and then fired for three hours in air at 560° C. to obtain Rh—Pt/TiO$_{2-x}$.

The fired mixture Rh—Pt/TiO$_{2-x}$ is milled for 2–5 days. Then about 90 percent of the milled powder is combined with about 10 percent of a binder, e.g., colloidal alumina, to form a washcoat slurry. A ceramic substrate, e.g., cordierite honeycombs sold by Corning, Inc., Corning, N.Y., under the trade name Celcor®, is dipped or washcoated in the slurry.

In general, any ceramic substrate that can withstand temperatures of approximately 150° C. to 600° C. can be used in the invention. A washcoat loading in the range of 30 to 40 percent is observed on the honeycomb substrate. The washcoated substrate is then fired in air or reducing atmosphere, e.g., forming gas or nitrogen gas, or exhaust gas at 600° C. for 3 hours with ramp rate of 3° C./min. The composition of the C2 deNO$_x$ catalyst is as follows: 1 percent by weight Rh, 2 percent by weight Pt, 90 percent by weight TiO$_{2-x}$, and 10 percent by weight Al$_2$O$_3$ (binder). Typically, the amount of Rh will be in a range from 0.01 to 5 percent, the amount of Pt will be in a range from 0.01 to 5 percent, and the amount of TiO$_{2-x}$ will be in a range from 0 to 100%.

Activity of the C2 deNO$_x$ catalyst in simulated diesel exhaust gases (see Table 1) was evaluated using the testing procedure described above (see FIG. 2). As shown in Table 5, the C2 deNO$_x$ catalyst demonstrated a high total NO conversion of 73 to 81.6 percent with diesel fuel injection rate of 1.75 mg/s and catalytic reactor outlet temperature of 450° C. to 560° C. For a diesel injection rate of 2.2 mg/s and catalytic reactor outlet temperature of 445° C. to 562° C., the C2 deNOx catalyst demonstrated a very high total NO conversion of 91.8 to 96.4 percent. This shows that increasing the fuel injection amount results in higher N$_2$ generation. However, the undesirable NH$_3$ generation also increases as the fuel injection amount is increased (see Table 5). For the C2 deNO$_x$ catalyst, the optimized condition is that the injection amount is less than 1.75 mg/s.

TABLE 5

Summary of Catalyst Activity for C2 DeNO$_x$ Catalyst Using Simulated Diesel Exhaust Gases

| O$_2$ (%) | Diesel Injection Rate (mg/s) | Outlet Temp. (° C.) | Total NO Conversion (%) | NH$_3$ (%) | N$_2$ (%) | Initial NO (ppm) |
|---|---|---|---|---|---|---|
| 6 | 1.75 | 450 | 73 | 4 | 69 | 511 |
| 6 | 1.75 | 480 | 77.1 | 4.1 | 73 | 511 |
| 6 | 1.75 | 520 | 81.6 | 6.1 | 75.5 | 511 |
| 6 | 1.75 | 560 | 76.7 | 6.8 | 70 | 511 |
| 6 | 2.2 | 445 | 91.8 | 11.2 | 80.6 | 501 |
| 6 | 2.2 | 490 | 96.4 | 11.6 | 84.8 | 501 |
| 6 | 2.2 | 518 | 94.6 | 12.6 | 82 | 501 |
| 6 | 2.2 | 562 | 93 | 10.4 | 82.6 | 501 |

EXAMPLE 3

In another embodiment of the invention, the deNO$_x$ catalyst 14 (shown in FIG. 1) includes a zeolite impregnated with one or more precious metals. Examples of precious metals suitable for use in the invention are Pt, Rh, Ru, Pd, and Ir. As previously mentioned, zeolites are silicates consisting of interlocking tetrahedrons of SiO$_x$ and AlO$_y$. An example of a zeolite that is suitable for use in the invention is ZSM-5. For high temperature stability, the silica to alumina mole ratio in the zeolite should be high. For example, for ZSM-5, the silica to alumina mole ratios is at least about 25, and preferably at least about 55. One source of ZSM-5 zeolite is supplied by Exxon Mobil Corp., Dallas, Tex., under the trade name MZ-12. Other examples of zeolites evaluated for use in the invention include mesoporous crystalline material (MCM-41), ultrastabilized Y (USY), NaY, H-ferrierite, and AlPO$_4$-5. In some embodiments of the invention, the zeolites are loaded with transition metals, e.g., Cu, In, Ga, Ni, Ag, or Co, or combinations thereof. H-ferrierite loaded with Ni—Co or Ag has been shown to be effective in reducing NO$_2$ to N$_2$. The catalyst may include up to 5 percent precious metals and up to 5 percent transition metals.

A C3 deNO$_x$ catalyst is attained by impregnation of Ni—Co loaded MZ-12 (ZSM-5; Si/Al=55) zeolite with Pt. MZ-12 zeolite is loaded with 1.5 percent Ni and 1.5 percent Co. The metals, Ni and Co, are added as their nitrate precursors. The MZ-12 zeolite is first weighed out, and amounts of nickel nitrate and cobalt nitrate to be combined with the zeolite are calculated. The nitrates are then dissolved in deionized water. MZ-12 zeolite powder is dispersed in the solution. The mixture is then stirred well followed by drying in an oven at about 110° C. to 120° C. for about 24 hours. The resulting dried powder is calcined at a ramp rate of 3° C./min to about 600° C. and held at that temperature for about 3 hours in air to obtain Ni—Co/MZ-12. The calcined mixture is extruded into honeycombs. Prior to extrusion, specific amounts of methocel, silicon resin, dibenzyl ether, and oleic acid are added to the calcined mixture. Both 200 and 400 cell density per square inch (cpsi) were extruded and fired at 850° C. for 3 hours. The extruded honeycomb bodies were impregnated with 2 percent Pt by dipping repeatedly in a 2 percent $(NH_3)_4Pt(NO_3)_2$ solution. Prior to catalytic testing, the samples are fired under air for 3 hours at 600° C.

The composition of the C3 deNO$_x$ catalyst is as follows: 2 percent Pt, 1.5 percent Ni, 1.5 percent Co, 90 percent MZ-12, and 10 percent $Al_2O_3$. Activity of this catalyst in simulated diesel exhaust gases (see Table 1) was evaluated using the testing procedure outlined above. As shown in Table 6, the C3 deNO$_x$ catalyst demonstrated a high total NO conversion of 71 to 77 percent with diesel fuel injection rate of 1.4 mg/s and catalytic reactor outlet temperature of 446° C. to 505° C. For a diesel injection rate of 2.2 mg/s and catalytic reactor outlet temperature of 550° C. to 600° C., the C3 deNO$_x$ catalyst demonstrated a high total NO conversion of 86 percent.

TABLE 6

Summary of Catalyst Activity for C3 DeNO$_x$ Catalyst Using Simulated Diesel Exhaust Gases

| $O_2$ (%) | Diesel Injection Rate (mg/s) | Outlet Temp. (° C.) | Total NO Conversion (%) | $NH_3$ (%) | $N_2$ (%) | Initial NO (ppm) |
|---|---|---|---|---|---|---|
| 3 | 1.4 | 446 | 71.2 | 7 | 64.2 | 1065 |
| 3 | 1.4 | 505 | 77 | 7.5 | 69.5 | 1065 |
| 6 | 2.2 | 550–600 | 86.1 | 9 | 77.1 | 524 |

EXAMPLE 4

In another embodiment of the invention, the deNO$_x$ catalyst 14 (shown in FIG. 1) includes a zeolite and metal-oxide mixture impregnated with one or more precious metals. A C4 deNO$_x$ catalyst is attained by impregnation of 50 percent MZ-12 (ZSM-5; Si/Al=55) zeolite and alumina mixture with a 1.12 g iridium (Ir) solution made from $IrCl_3.3H_2O$ to achieve a 45 g/ft$^3$ washcoat loading on a 3.25 in.×1 in. ceramic substrate, e.g., cordierite honeycombs made by Corning, Inc., Corning, N.Y., under the trade name Celcor®, with a cell density of 400 cpsi. The alumina in the zeolite and alumina mixture may exist in its various forms including La-γ-β-$Al_2O_3$. The C4 catalyst is prepared using a method similar to the one described for the C2 catalyst. The alumina binder used in this example is 15 percent colloidal alumina, e.g., colloidal alumina under the trade name Al-20 by PQ corporation. All catalytically tested substrates have a diameter of about 1 inch and a length of about 1 inch. In an alternative embodiment, the C4 deNO$_x$ catalyst may be formed by drying the zeolite, alumina, and iridium mixture in an oven and then firing the dried mixture. The fired mixture may be extruded into honeycombs.

The composition of the C4 deNO$_x$ catalyst is as follows: 1 percent Ir, 50 percent ZSM-5 zeolite, such as one sold under the trade name MZ-12 by Exxon Mobil, Corp., Dallas, Tex., and 50 percent $Al_2O_3$. Activity of this catalyst in simulated diesel exhaust gases (see Table 1) was evaluated using the testing procedure outlined above. The catalytic activity was evaluated under various oxygen concentrations (3 to 5 percent) with constant fuel injection rate of 1.4 mg/s. As shown in Table 7, the C4 deNO$_x$ catalyst demonstrated a high total NO conversion of 70 to 96 percent with diesel fuel injection rate of 1.4 mg/s and catalytic reactor outlet temperature of 390° C. to 516° C. Maximum $N_2$ generations of 93 percent, 90.7 percent, and 83.4 percent were observed at 400° C. with 3 percent, 4 percent, and 5 percent oxygen, respectively. The $N_2$ generation decreased with increasing temperature. The undesirable by-product $NH_3$ was relatively low. The total NO$_x$ conversion using catalyst C4 were very high when the simulated diesel exhaust gases contained 3 percent and 4 percent oxygen.

TABLE 7

Summary of Catalyst Activity for C4 DeNO$_x$ Catalyst Using Simulated Diesel Exhaust Gases

| $O_2$ (%) | Diesel Injection Rate (mg/s) | Outlet Temp. (° C.) | Total NO Conversion (%) | $NH_3$ (%) | $N_2$ (%) | Initial NO (ppm) |
|---|---|---|---|---|---|---|
| 3 | 1.4 | 400 | 96 | 3 | 93 | 525 |
| 3 | 1.4 | 419 | 96.6 | 11.6 | 85 | 525 |
| 4 | 1.4 | 390 | 94.1 | 3.4 | 90.7 | 525 |
| 4 | 1.4 | 431 | 95.4 | 6.3 | 89.1 | 525 |
| 5 | 1.4 | 393 | 87.4 | 4 | 83.4 | 525 |
| 5 | 1.4 | 438 | 62.7 | 3 | 59.7 | 525 |
| 5 | 1.4 | 516 | 70.5 | 4.6 | 65.9 | 525 |

The deNO$_x$ catalysts of the invention demonstrate high activities for the reduction of NO$_x$ to $N_2$ in simulated diesel exhaust gases using diesel fuel as reductant. No other fuel or gas tanks are needed to be installed because on-board diesel fuel can be used. The amounts of $NO_2$ and $N_2O$ generation are minimal. The catalyst may be extruded, resulting in a material with a larger volume of catalyst than in the washcoated case, which may lead to enhanced performance. It is observed by FTIR (22 in FIG. 2) that a lot of light hydrocarbons are not used, which means that fuel penalty can be decreased. A partial oxidation catalyst (not shown) may be added downstream of the deNO$_x$ catalysts (14 in FIG. 1). Adding a partial oxidation catalyst downstream of the deNO$_x$ catalysts can (a) decrease the emission of the hydrocarbon into atmosphere, (b) use the hydrocarbon generated by diesel fuel partial oxidation to reduce NO to $N_2$, (subsequently, NO is also reduced by acting as an oxidant for the hydrocarbon) and (c) decrease the requirement of the NO conversion at the deNO$_x$ catalyst, i.e., the amount of the fuel injected will be decreased.

To enhance total NO$_x$ reduction, some metal or metal oxides are active for partially cracking diesel into lighter and efficient reductants. Such metal or metal oxides may include the following: precious metal, transition metal/metal oxide, and rare earth metal/metal oxide or their combination. A considerable advantage in activity is expected to be gained from a high pressure diesel injector, which will atomize the fuel. Perovskite compound has low surface area Its catalytic performance can be enhanced by increasing surface area with different synthesizing methods, e.g., the Pechini process described above. Gasoline is an alternative reductant that may be used instead of diesel to reduce charring. Gasoline is expected to lower the light off temperature for $NO_x$ reduction.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A reductant injection system for reducing exhaust gas $NO_x$ in lean-burn engines, comprising:

a catalytic reactor having an inlet end which receives exhaust gas containing $NO_x$, an outlet end which outputs converted exhaust gas, and a port;

a catalyst mounted inside the catalytic reactor for reducing $NO_x$ in the received exhaust gases to $N_2$ in the presence of a fuel, wherein the catalyst comprises a perovskite compound represented by the formula $AB_{1-x}PM_xO_3$, where A is a rare-earth metal, B is a transition metal, PM is a precious metal, and O is oxygen, and is positioned downstream of the port in catalytic reactor; and a fuel injector coupled to the port in the catalytic reactor and being positioned upstream of the catalyst, wherein the fuel injector injects diesel fuel in the exhaust gas prior to the exhaust gas passing through the catalyst, wherein the fuel is used as a reductant.

2. The system of claim 1, further comprising a partial oxidation catalyst mounted downstream of the catalyst.

3. The system of claim 1, wherein A comprises lanthanum, B comprises manganese, PM comprises ruthenium, and x ranges from about 0.01 to 0.3.

* * * * *